United States Patent
Somaiya et al.

(10) Patent No.: US 11,423,104 B2
(45) Date of Patent: Aug. 23, 2022

(54) TRANSFER MODEL LEARNING FOR RELEVANCE MODELS

(71) Applicant: Microsoft Technology Licensing, LLC, Redmond, WA (US)

(72) Inventors: Manas Haribhai Somaiya, Sunnyvale, CA (US); Mohit Rajkumar Kothari, Dublin (IE); Ian Robert Ackerman, Mountain View, CA (US); Yuan Shao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 363 days.

(21) Appl. No.: 16/557,263

(22) Filed: Aug. 30, 2019

(65) Prior Publication Data
US 2021/0064682 A1    Mar. 4, 2021

(51) Int. Cl.
*G06F 16/9535*    (2019.01)
*G06F 16/957*    (2019.01)
(Continued)

(52) U.S. Cl.
CPC ...... *G06F 16/9535* (2019.01); *G06F 16/9536* (2019.01); *G06F 16/9538* (2019.01);
(Continued)

(58) Field of Classification Search
CPC ............. G06F 16/9535; G06F 16/9536; G06F 16/9538; G06F 16/9577; G06Q 50/01; G06N 3/08; G06N 20/00
See application file for complete search history.

(56) References Cited

U.S. PATENT DOCUMENTS

| | | | | |
|---|---|---|---|---|
| 2010/0082660 A1* | 4/2010 | Muilenburg | .......... | G06F 16/337 707/768 |
| 2015/0186945 A1* | 7/2015 | Samuel | .............. | G06Q 30/0267 705/14.25 |

(Continued)

FOREIGN PATENT DOCUMENTS

WO    WO-0165507 A2 *    9/2001    .........  G07F 17/3288

OTHER PUBLICATIONS

Yan, Shuhan, et al. "Transfer learning for cross-platform software crowdsourcing recommendation." 2017 24th Asia-Pacific Software Engineering Conference (APSEC). IEEE, 2017. (Year: 2017).*
(Continued)

*Primary Examiner* — William Spieler
(74) *Attorney, Agent, or Firm* — Schwegman Lundberg & Woessner, P.A.

(57) ABSTRACT

Systems and techniques for a transfer model learning for relevance models are described herein. In an example, a system for member relevance prediction is adapted to collect a first data set of member interactions with the online service that occur on a first platform and train a first model using the first data set. The system for member relevance prediction may collect a second data set of member interactions with the online service that occur on a second platform. The system for member relevance prediction may predict a third data set related to member interactions using the first model and aggregate the first data set, the second data set, and the third data set. The system for member relevance prediction may train a second model for the second platform using the aggregated platform data and predict for the second platform, using the second model, online service items for the member.

20 Claims, 7 Drawing Sheets

(51) Int. Cl.
*G06N 3/08* (2006.01)
*G06F 16/9538* (2019.01)
*G06N 20/00* (2019.01)
*G06F 16/9536* (2019.01)

(52) U.S. Cl.
CPC .......... *G06F 16/9577* (2019.01); *G06N 3/08* (2013.01); *G06N 20/00* (2019.01)

(56) References Cited

U.S. PATENT DOCUMENTS

| | | | | |
|---|---|---|---|---|
| 2015/0269630 | A1* | 9/2015 | Flood | G06Q 30/0267 705/14.66 |
| 2015/0324434 | A1* | 11/2015 | Greenwood | G06F 16/9566 707/722 |
| 2016/0335603 | A1* | 11/2016 | Davar | G06F 16/28 |
| 2017/0064033 | A1* | 3/2017 | Stackel | G06Q 50/34 |
| 2018/0075367 | A1* | 3/2018 | Yates | G06Q 30/0269 |
| 2018/0240172 | A1* | 8/2018 | Barry | G06F 16/9535 |
| 2018/0268467 | A1* | 9/2018 | Labarre | G06F 16/9027 |
| 2019/0294976 | A1* | 9/2019 | Vangala | G06F 16/24539 |
| 2019/0318032 | A1* | 10/2019 | Vangala | G06N 5/022 |
| 2019/0362368 | A1* | 11/2019 | Levy | G06F 16/22 |
| 2020/0004884 | A1* | 1/2020 | Gibson | G06F 16/9535 |
| 2020/0007634 | A1* | 1/2020 | Xie | G06F 17/16 |
| 2020/0110519 | A1* | 4/2020 | Vangala | G06Q 30/0641 |
| 2020/0110623 | A1* | 4/2020 | Vangala | G06F 16/951 |
| 2020/0110783 | A1* | 4/2020 | Ushanov | G06N 3/04 |
| 2020/0293975 | A1* | 9/2020 | Faulkner | G06F 16/90332 |
| 2020/0322214 | A1* | 10/2020 | Yuan | H04L 47/82 |

OTHER PUBLICATIONS

Roy, Suman Deb, et al. "Socialtransfer: cross-domain transfer learning from social streams for media applications." Proceedings of the 20th ACM international conference on Multimedia. 2012. (Year: 2012).*

Jiang, Meng, et al. "Little is much: Bridging cross-platform behaviors through overlapped crowds." Thirtieth AAAI Conference on Artificial Intelligence. 2016. (Year: 2016).*

Sun, Jun, Steffen Staab, and Jérôme Kunegis. "Understanding social networks using transfer learning." Computer 51.6 (2018): 52-60. (Year: 2018).*

Pan, et al., "A Survey on Transfer Learning", In Proceedings of IEEE Transactions on Knowledge and Data Engineering, vol. 22, Issue 10, Oct. 2010, pp. 1-15.

* cited by examiner

TRANSFER MODEL LEARNING FOR RELEVANCE MODELS

TECHNICAL FIELD

Embodiments described herein generally relate to optimizing the content presented to a member of an online service, specifically optimizing the content based on a device.

BACKGROUND

An online network, such as an online service, provides content from the online network to a member of the online network. The member may access the online network from different devices, in different locations, and at different times of day. The member may view different types of content from the online network based on the factors of how they access the online network, such as the device used for access to the online network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
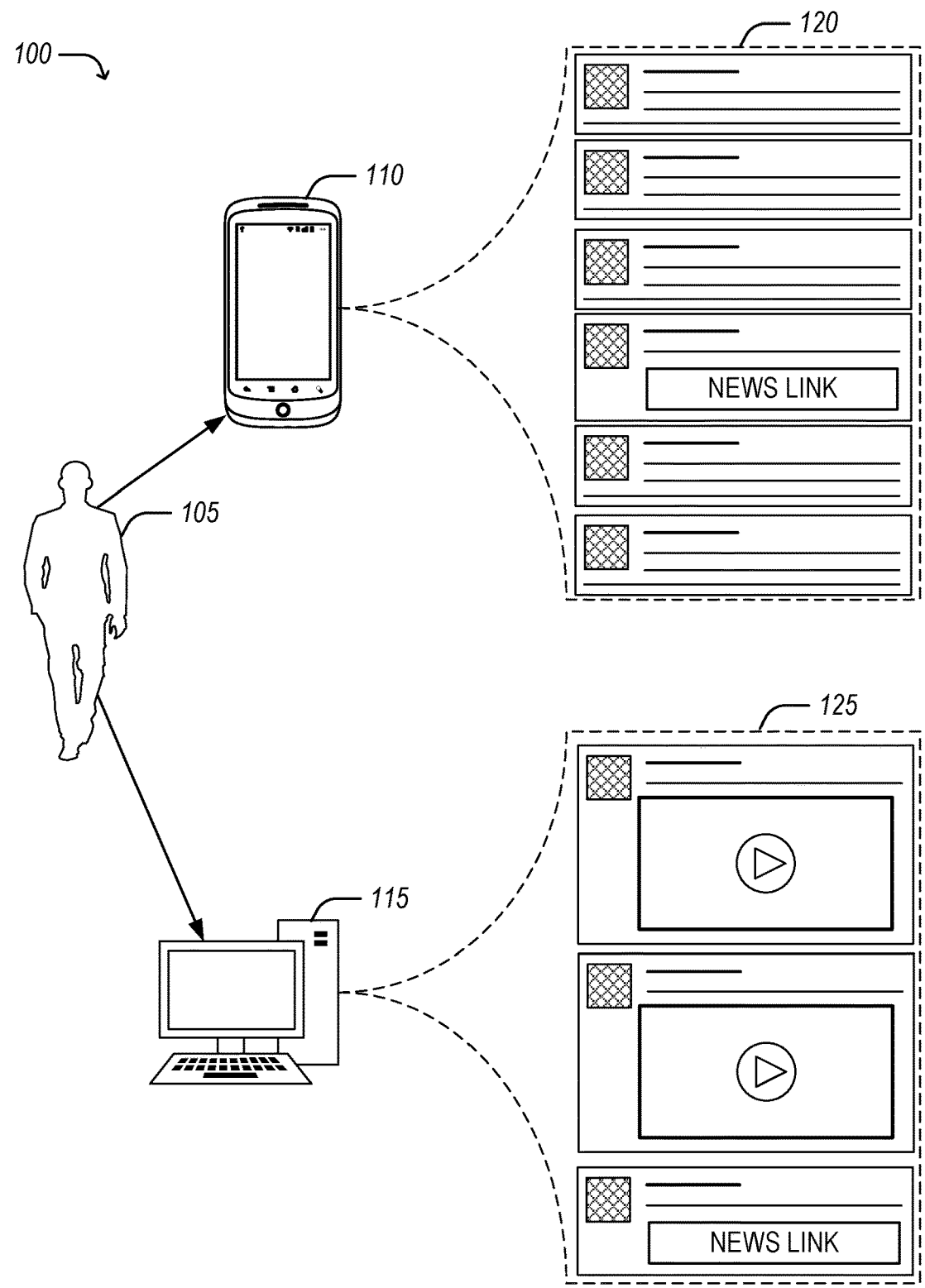
FIG. 1 illustrates an example of a member of an online service accessing the service, in accordance with some embodiments.

An online service, such as a social networking service, may provide functionality for a member to access content and data from the online service. The content may include updates from other members of the online service or data relevant to the member's interests and preferences. The content may be provided to the member in a feed, or list of content items. These items in the feed may typically be presented to the member in chronological order. Other presentation sorting options may exist, such as by relevance to the member's interests or member identified prioritizations.

The content items in the feed may include multiple types of content, such as text, images, sounds or music, videos, member profiles, and internet links. For an online service directed towards professionals, members may post opinions, ideas, career related updates, recommend jobs, and provide suggestions in multiple formats which include short text, long-form articles, live videos, and photos.

Providing a member with an optimal experience of the online service may be a goal of the online service as it may encourage the member to continue using the online service. If a member becomes frustrated or discouraged by their experience with the online service, they may start to use the online service less. The overall online service may then suffer as the quality of the online service may be dependent upon the use and interaction of the members.

A member may be encouraged to use the online service when their experience is optimal and thus resulting in positive interactions with the online service. One embodiment of providing an optimal member experience may be to provide a feed and feed updates that are best catered to the member. Feed updates comprise of a large pool of heterogeneous content ranging from activities from a member's network, courses to improve member's skills, job postings, news stories, and more.

Factors, features, or signals that may be used to determine the items that appear in a feed for a member may include notifications that were clicked by the member, jobs the member applied, content included in private or direct messages to other members, items the member reacted positively to, and items the member interacted with, such as leaving a comment or following a link. The factors are relevant pieces of content or data that may be used to personalize a feed for a member. Included in the personalization, a ranking may occur to present some items before others. Separate from the feed, members may interact with other verticals like messaging, notifications, and advertisements. In order to personalize a member's feed, feed models may use a rich set of features which may be derived from member's behaviors with the feed. Content captured outside of the feed may be helpful to improve the feed experience of the member.

Example methods and systems are directed to determining user interactions, such as with an online network, on different platforms. The interactions may then be used to identify preferred content for each respective platform. This presents a technical problem of identifying, such as from a database, preferred content related data for different platforms. Using transfer learning data from one platform may be exploited to other platforms. The disclosed methods and systems has a number of technical benefits such as generating data for sparser datasets from richer datasets, transferring learned data from one platform to another, more accurate data searches based on platform, less database reads, and less processing and transmission of data when preferred data is identified.

In an embodiment, a feed platform may utilize a multi-stage ranking system where first stage is a candidate selection on different content types and second stage is blending of such updates and recommending a final list of feed updates to the member. The second stage utilizes a multi-objective optimization (MOO) in-order to make the feed more personalized for the member while making relevant business trade-offs.

Disclosed in some examples are methods, systems, and machine-readable media which use content gathered about a member's interaction with the online network on a first platform to inform what a member's interaction with the online network may be on a second platform. Additionally, the interaction on the second platform may inform the interaction on the first platform. The concept of transfer learning includes utilization of data points, feature values, and models from one application domain to add feature values and improve models in another application domain. Transfer learning is a methodology where knowledge gained while solving one particular task, like features or model output, is reused or leveraged in order to improve performance on a related task which may be in a different domain.

The terms platform and application domain may be used interchangeably. Both platform and application domain refer to the device and environment where a member chooses to access and interact with the feed (and other aspects) of the online service. For example, how the member interacts with the online service through their mobile device, may be different than when using their desktop computer. Additionally, environmental aspects may be a factor, where how the member interacts with the online service on their laptop computer may be different during the day while at work than at night while at home. An environmental aspect may be the operating system of the device, such as identifying differences between member usage for iOS, Android, Windows, and MacOS.

Factors and features may include authors and viewers, where an author may be the source of materials (e.g., another member of the online service or a content creator) with the member being the viewer. Thus, if distinctions may be made about when, where, or on what device a user chooses to interact with a certain author may inform how to present content from the author to the member.

Sharing and transfer learning may occur across application verticals such as feed, messaging, notifications, advertisements, job searches, sales navigators, recruiting, and publishing. The relationship of how a user interacts with the messaging portion of a platform or application domain may be used to inform how content is presented in the feed. For example, if a member interacts frequently with a second member using messaging, then this interaction knowledge and modeling may be transferred to be used with the feed modeling and thus informing the feed modeling that the member interacts with the second member and increasing the second member presence in the member's feed.

A member's feed may contain diverse and heterogeneous content ranging from activities from a member's network, courses to improve member's skills, job postings, news stories, and more. A member may engage with the feed updates by performing various actions. For example, a member may simply "like" (provide a positive reaction) an update, share or comment on an update, click on the update to access the full content of the update, or dwell (spend time) on an update. To personalize a member's feed and understand their preferences, actions and/or time spent may be captured to model the prediction of such actions. Each of the actions that a member takes may have an impact on the overall feed ecosystem. One example is, if a member shares an article, the shared article becomes candidate of recommendation for the member's connections and followers.

To provide an optimal feed to the member, several techniques using transfer learning may be employed. Each of these techniques may use different machine-learning models. Each of these machine-learned models may use different algorithms and techniques such as linear regression, logistic regression, support vector machines, gradient boosted decision trees (GBDT), and neural networks, depending upon the task at hand.

FIG. 1 illustrates an example 100 of a member 105 of an online service accessing the service, in accordance with some embodiments. A member 105 of an online service may choose to access the online service on multiple platforms. In the example 100, two platforms are represented, a mobile device 110 and a desktop computer 115. A platform is not limited to the type of device, but may be any distinction about how the member 105 accesses the online service differently. A platform may be different operating systems, geolocations, or time of day.

In the example 100, when the member 105 accesses the online service with the mobile device 110, their interactions with the online service may indicate the member 105 typically reads and interacts with posts from other members and links to news articles. Additionally, when the member 105 accesses the online service with the desktop computer 110, their interactions with the online service may indicate the member 105 typically interacts with videos and links to news articles. The information about how the member 105 interacts with each platform may be used to learn how the member 105 interacts with each platform individually (i.e., the interactions with the mobile device 110 inform how the member 105 interacts with the mobile device 110). The information about how the member 105 interacts with a group of platforms may be used to inform how the member 105 interacts with a platform on in the group of platforms (i.e., the interactions with the desktop computer 115 may inform how the member 105 interacts with the mobile device 110).

Thus, to provide an optimal experience, the member 105 is presented with posts from other members and links to news articles in mobile screen image 120. Further, the member 105 is presented with videos and links to news articles in desktop screen image 125. For member 105, news article are platform independent as the two platform models have informed each that this behavior of member 105 has occurred on both platforms. Interacting with videos and posts from other members are platform dependent as the platform models transfer of learning indicates a preference by the member 105 for accessing videos on the desktop computer 115 and posts from other members on mobile device 110.

Multiple techniques employing models and transfer learning may be used to improve the feed for members of an online service across platforms. These techniques may include model sharing, feature sharing, label sharing, and embedding sharing.

Model sharing includes building intermediate action models that may be shared across more than one final action prediction model. For example, in relation to feed, actions may include click, like comment, and share. Some actions may be combined, such as like, comment and share may be considered a viral action, as likes, comments and shares have less overall volume than clicks. Both to understand non-linearities among a rich set of features and for model sharing, gradient boosted trees may be trained on click and viral responses as intermediate models. The learned feature interaction paths in these intermediate tree models may be then used as a features in logistic regression models for all actions—clicks, virals, likes, comments, and shares. In this framework, there are a couple of areas where platform adaptation techniques may apply in-order to leverage the information contained within different actions. First, by using knowledge gained from click models into like, share, comment, and viral models. This results in classic example of using a richer/denser and larger dataset to transfer knowledge to a smaller and sparser dataset. Second, feedback obtained by sparser signals of like, share, and comment may be more important than a simple click. The information contained in models trained on these stronger signals may be beneficial to a model predicting just clicks.

A cross platform model attempts to learn the non-linear interactions between the features across more than one platform. Member's overall and platform specific behavior patterns may be extracted out based on the features. The cross platform model attempts to determine member behaviors based on the feature values. Some features that are platform dependent may be computed separately for each of the platforms. For example, the interaction history between a viewer and author on each platform could be captured separately. For example, the member's preference for watching videos on each platform could be captured separately. Some features that are platform independent may be computed across all the platforms. For example, member's total daily time spent could be captured in a platform independent way by summing up total time spent on each platform.

The cross-platform model may employ gradient boosted trees (GBDT). A GBDT may be created for each platform. For example, if the platform is device dependent, a GBDT may be created for a mobile device, a tablet, a desktop computer, and a laptop computer. The platform specific GBDT captures the behavior from that platform. Platform specific GBDT may use only platform dependent features. A combined GBDT model may be trained by combining platform dependent features with platform independent features. A cross-platform model may use any other popular machine learning model such as neural networks in a similar way.

The GBDT from each platform is a low-dimensional representation of member behavior on that platform. This platform specific GBDT can be used to improve the prediction accuracy of machine learning models on a different platform by transfer learning techniques such as model sharing. Other types of machine learning models may be employed, such as logistic regression and neural networks.

For each platform there may be a relationship for an author and a viewer, understood for that platform. Similarly, there may be a relationship of a viewer to certain topics for the platform. There may be a relationship for a viewer and type of update, article, video, or image. The relationships are learned independently for each platform and then the relationship information is used from a first platform on a second platform to inform further what to show the member on the second platform.

Member behaviors may be platform independent and platform dependent. The relationship information may help determine what behaviors are platform dependent. When the relationships from one platform are applied to another platform, there may be some behaviors that are recognized as occurring in both platforms. These may be platform independent behaviors. A platform dependent behavior may be a behavior that occurs only on one platform. This process helps distinguish the two platforms to improve what is presented on each. The effect may be to boost one content or type for a first platform and downgrade the content or type for a second platform.

For example, if the platform relationships and models were kept separately, when a member does not interact with a particular type of content on a first platform, it may be assumed that the member does not like that particular type of content. However, by introducing the behavior models of a second platform, with the member interacting with the particular type of content on the second platform, a more accurate representation of the member's behaviors may be determined. Instead of an assumption that the member does not interact with the particular type of content, it may be determined the member has preferences regarding which platform the member interacts with the particular type of content. Thus providing greater context for the online service to customize the member experience, such as the member's feed, by understanding that the member does interact with the particular type of content, but it must be presented on certain platforms.

Behaviors may be separated by individual actions, such as click, like, or share. The underlying relationship between these actions is first learned to understand the action a member might take. Thus, the models are learned in a two-step process. First step is to learn an intermediate representation between all the actions, using tree models. The intermediate representation is the relationship of a member's positive actions the member might take on certain content from a certain author. In other words, actions such as click, like, or share are all positive actions and are grouped together as such. The intermediate models may be used to build a second layer of models. The second layer of models are dedicated to a particular positive action, such as click, like, or share.

Conversely, the same principles could be applied to negative reactions. Negative reactions may be direct actions such as the member indicating to hide or unfollow content from a certain author or source. The negative reactions may be indirect, such as information related to how quickly a member ignores or scrolls past content. This may result in building models for what content to hide from a member.

Separating behaviors based on a platform and then using transfer learning to cross inform platforms provides three different signals: what a member likes to do on both platforms, what a member likes to only do on the current platform, and what the member would not like to do on the current platform but still likes to do on another platform. This type of cross model learning may be used across users to learn broader behavior patterns. Combining across multiple platforms and multiple members may determine greater patterns, for example how users interact with the online service using their mobile device in the city of Phoenix, Ariz.

Feature sharing may include using a feature model for a first application to inform predictive models of a second application. For example, a feature model based on information from a messaging application of the online service may be used to inform an action prediction model for the feed of an online service.

The following is two use case examples of cross-domain adaptation transfer learning techniques. First, messages between two members are an intuitively strong signal demonstrating a member's potential interest in interaction on feed updates published by each of the two members. Hence, messaging features should be shared with feed action prediction models. Second, because the volume of actions taken by members with advertisements may be lower than the volume of actions with organic posts, the features from feed actions should be shared with advertisement action prediction models.

Different features may be used within a feed action prediction model to capture a member's affinity to different content types and interest types. To learn a member's content and interest type affinity, a Gamma Poisson feature model may be trained which uses several member profile based features along with historical interaction counts of a member with different content type to predict the member's affinity to each content type. These learned affinities may then be further used as a feature within action prediction models for the feed. A content-based feature may capture a member's interest into different set of topics, like Technology, Machine Learning, or Sports using an internally built content classifier trained with specific ontologies. In an example, each of these features may be leveraged within the advertisement models to predict the likelihood of a click on an advertisement generating a lead.

Figure 2:
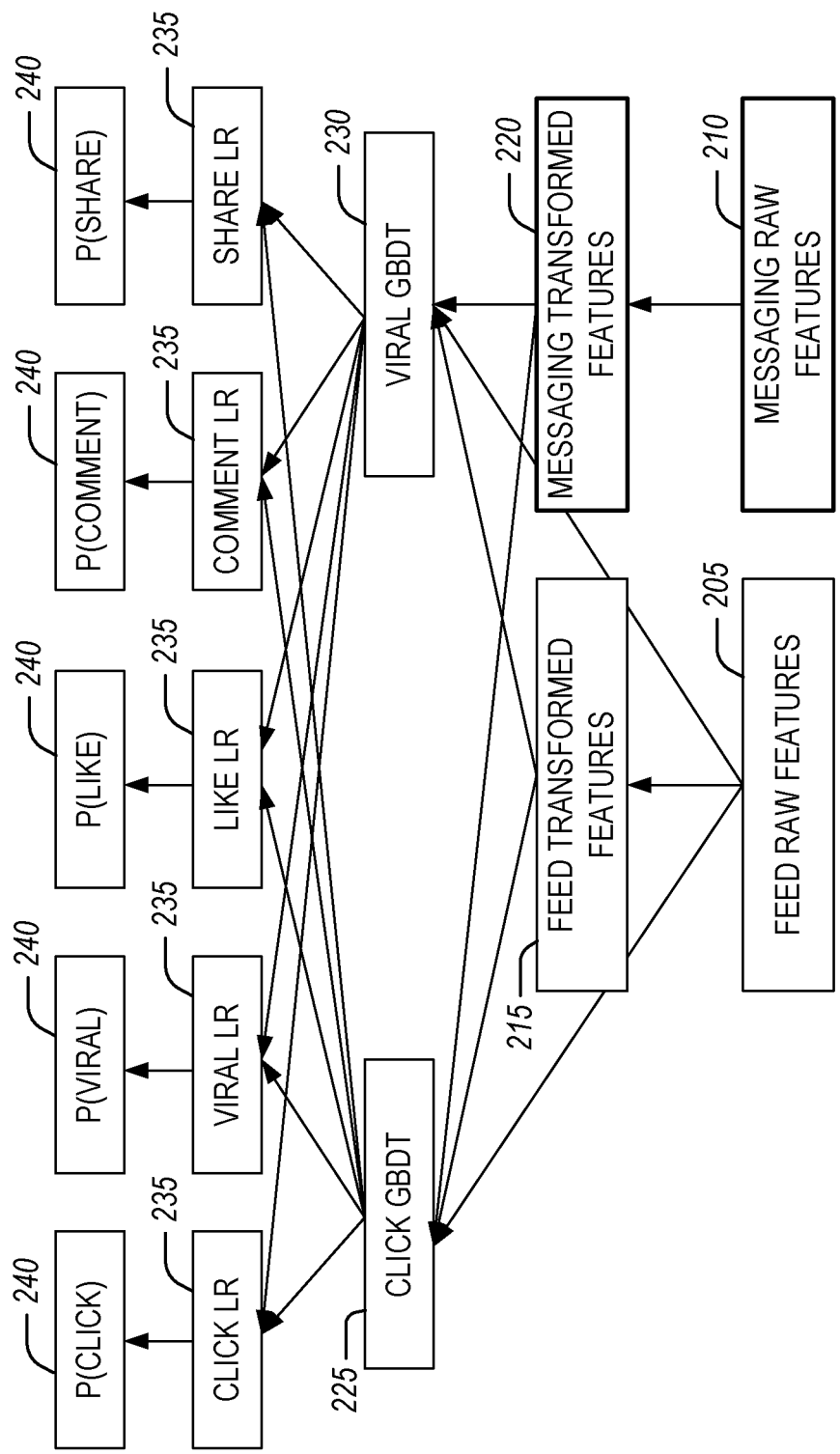
FIG. 2 is an example architecture of sharing messaging features with feed action models, in accordance with some embodiments.

FIG. 2 is an example architecture 200 of sharing messaging features with feed action models, in accordance with some embodiments. The example architecture 200 is for improving the feed framework by including the learning from messaging. The example architecture 200 starts with the feed raw features 205 and messaging raw features 210 for a particular member of the online service. The features capture a member behavior when accessing a platform, in this instance the feed of the online service and the messaging application. Features may capture information about the viewer (member), the feed item, the author (originating member) of the item, edge features between the viewer and author, and contextual aspects of the member's feed session. As logistic regression models may not capture non-linear interactions well, some of the features may be transformed as feed transformed features 215 and messaging transformed features 220.

The feed raw features 205, feed transformed features 215, messaging raw features 210, and messaging transformed features 220 may be used to train models for click and viral as a click GBDT 225 and viral GBDT 230. Viral may include actions such liking, commenting and sharing. GBDTs may be used in a stage wise fashion to boost the prediction models. From the click GBDT 225 and viral GBDT 230, logistic regression models 235 may be trained using the combined features of feed and messaging. The logistic regression models 235 may include a model for click, viral, like, comment, and share. Using the logistic regression models 235, a prediction 240 may be used to predict whether a member will perform the associated action with a particular online service item, such as a video. For example, the logistic regression models 235 are trained based on a member's actions and behaviors. Thus, when a particular online service item is provided to each of the logistic regression models 235, a corresponding prediction 240 is generated that indicates the probability the member will perform the corresponding action with the provided online service item.

Figure 3:
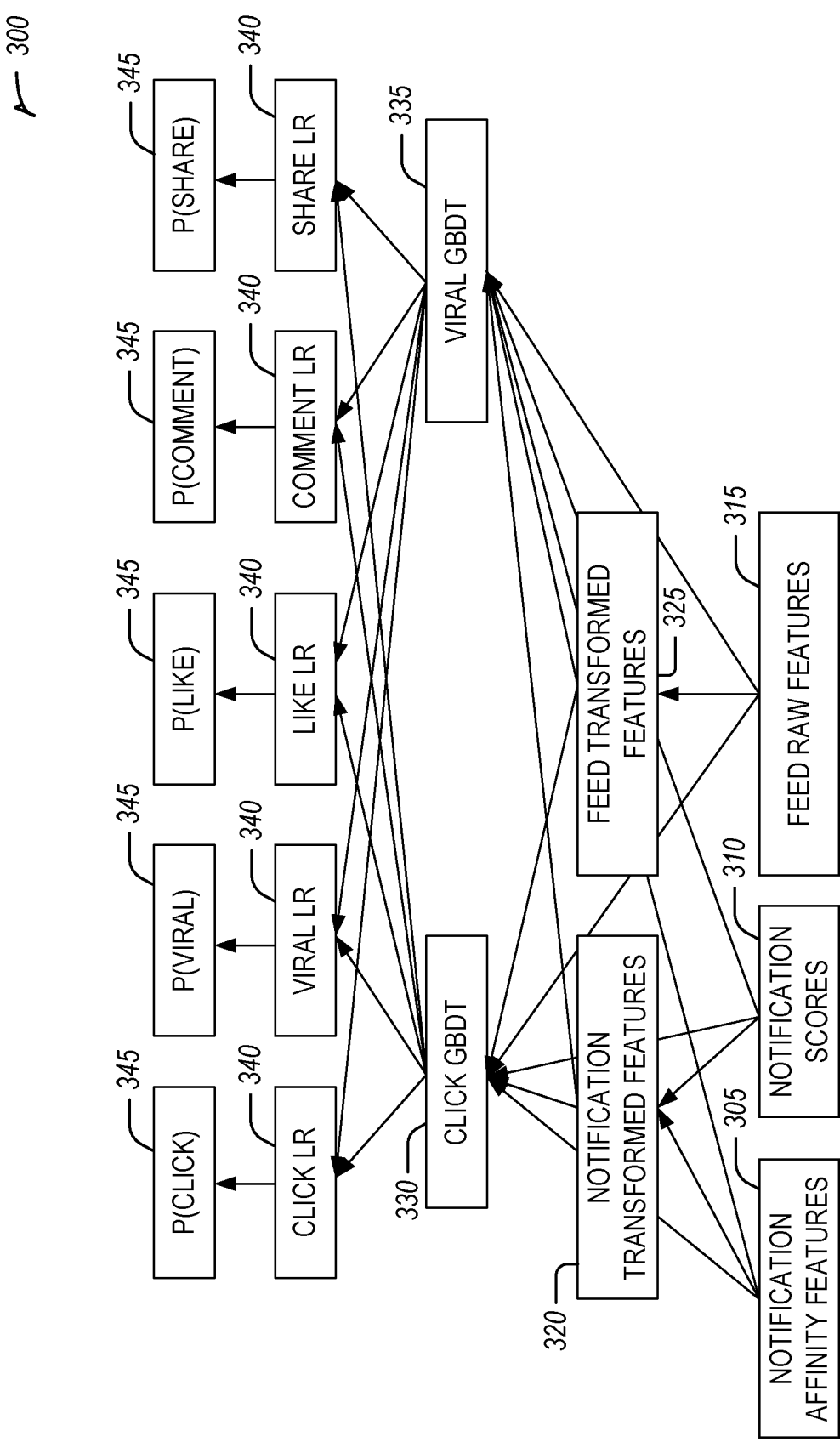
FIG. 3 is an example architecture of sharing notification features with feed action models, in accordance with some embodiments.

FIG. 3 is an example architecture 300 of sharing notification features with feed action models, in accordance with some embodiments. Similar to example architecture 200, example architecture 300 is a set of prediction models for the feed of a member. This included capturing a data set of member behaviors with the feed as feed raw features 315, and transforming some of those features as feed transformed features 325.

For example, architecture 300, notification features are used to inform the feed predictions. The notification features are provided through notification affinity features 305 and notification scores 310. Notification affinity features 305 may include a member's interest and preference toward authors, content and interest types. Notification scores 310 may be scores from a model trained on subject matter relevance to the member. The notification scores 310 may be used as features. Similar to the feed raw features 315, some of the notification affinity features 305 and notification scores 310 may be transformed for use in modeling as notification transformed features 320.

The notification affinity features 305, notification scores 310, feed raw features 315, notification transformed features 320, and feed transformed features 325 may be used to train a click GBDT 330 and viral GBDT 335. The click GBDT 330 and viral GBDT 335 may be used to train logistic regression models 340 using the combined features of feed and notification. The logistic regression models 340 may include a model for click, viral, like, comment, and share. Using the logistic regression models 340, a prediction 345 may be used to predict whether a member will perform the associated action with a particular online service item.

A machine-learned notification model may provide scores for a given update and member to then rank the update. The score may determine if a notification will be sent to member. The score may determine if the update should be presented to the member in the feed. The score is based on the member originating the update "author", the member viewing the update "viewer", and the characteristics of the update itself. The score may be based on previous interactions between the author and the viewer. The notification model may determine if the update will be seen positively or negatively by the viewer. A score may be determined for all authors and all viewers, whether the notification was shown or not.

A machine-learned feed model may use transfer learning methodology to improve prediction accuracy by leveraging knowledge across various feed actions, such as likes, comments, and shares. The scores of notification models may be used as feed model features. Notifications may be scored by several different notification models before being served to users. Notification scores may be computed for all authors, viewers, and updates. In order to make useful features from notification scores, they may be aggregated to create viewer features, author features, and viewer-author pair features for feed models. Many aggregation methods such as mean, median, minimum, maximum, may be utilized to generate these features. Although utilization of notification model scores as features in feed models is described, this approach may be extended to any two application domains or application verticals.

A feature model is based on historical interactions. The feature model essentially uses a count of the historical interactions of a member. This may include the number of clicks, reactions, or viral actions a member performs with items, updates, messages, and more on the online service. The historical counts are used to train the feature model. This information, or historical count data, may only be available if the online service item is chosen to be shown to the member. Thus, data cannot be collected unless it is actually presented to the member. This has the drawback of requiring the online service item be presented to the member to receive the historical data. In order to estimate predicted historical interactions of a member, the feature model may utilize machine learning methods to generalize patterns based on observed collected data. Characteristics of members and items, updates, messages, etc. may be used as inputs to the feature model. The feature model learns the patterns of theses inputs and their relationships to historical interactions. By using a feature model instead of historical interaction counts, it may be possible to overcome this drawback.

A feature model learned from one application domain may be used as features for a machine learning model in another domain to improve its predictive power. For example, a feature model learned on a member's notification clicks that captures a member propensity to click on notifications can be used as an input feature to feed machine learning models.

Label sharing may include training a new model with a new data set by combining feed features and notification labels. The intent behind this is to transfer the learning from notification responses. The output of the new model may be added to feed models as new features.

A member of an online service may receive different types of notifications from the online service. For example, an online service may have notifications such as "shared by network", "publish by network", and "mention in the news". These notifications may provide insight about the member's behavior.

For example, a dataset may be created by taking a member's notification actions (e.g. click on a notification) and joining them based on primary keys for feed specific features such as the receiver, the sender, and the receiver-sender edge. The receiver, sender, and receiver-sender edge may translate to viewer, author, and viewer-author edge on the feed. The feed specific features are captured by observing feed model training datasets with those mapped primary keys within a certain join window (for e.g. 24 hours). The join window is required to capture a relevant snapshot of feed features around the same timeframe when the notification label was generated.

The merged dataset trains a new model, such as a gradient boosted tree, and is utilized by feed action models as interaction features. A key advantage of this type of transfer learning is that as long as there is identification of the primary keys, key mappings, and join window, there may not be a need to share features/models between domains. This makes such models easier to evaluate, experiment, and add to production.

Figure 4:
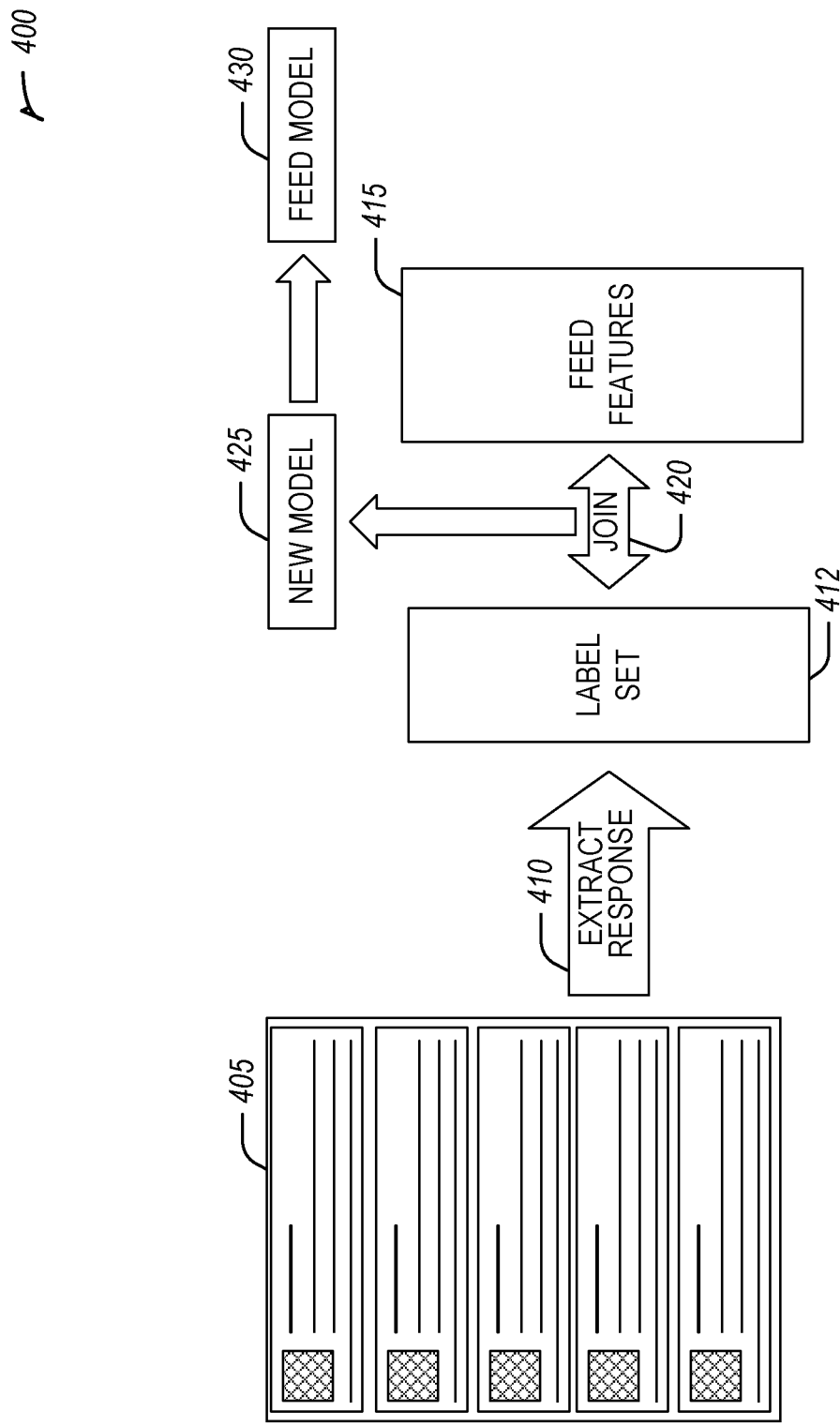
FIG. 4 is an example of an architecture of using notification labels for improving feed action models, in accordance with some embodiments.

FIG. 4 is an example of an architecture 400 of using notification labels for improving feed action models, in accordance with some embodiments. In architecture 400, a member may have notifications 405. The behavior and interactions the member has with the notifications 405, along with the data of the notifications in general may be used to improve the feed model 430 through labeling. The notifications 405 each have different features or characteristics. For example, the notifications 405 each have an author or originator. The notifications 405 may be specific for the member or may be directed to a group the member is a part of. Additionally, there is the type of notification, such as when an article by the member has been shared or published, or alerts about messages or job opportunities.

At operation 410, the member's responses to the notifications 405 may be extracted. From the extracted responses in operation 410, the notifications 405 are labeled based on the member's interaction and behavior with the notifications 405 to create a label set 412. This may include actions such as clicking on a notification, ignoring a notification, or specifically deleting a notification.

At operation 420, the label set 412 is joined with the feed features 415. By labeling the notifications to correspond with the feed, similar features may be joined to build an improved model based on both the notifications 405 and the feed features 415. The joining operation 420 may join the feed features 415 and the label set 412 on certain primary keys, such as the sender or author. For example, a member may click or like several updates from a second member that appear in the member's feed. This may inform that the member has some interest with the second member. The notification 405 and member responses may additionally show that the member specifically clicked on a notification from the second member. This may indicate the member has a strong interest with the second member. Thus, joining the member behaviors toward the second member from both the notifications 405 and the feed features 415 indicate the member has a strong affinity for the second member and would likely prefer to see and interact with more updates from the second member.

The joined data of the label set 412 and the feed features 425 may be used to train a new model 425. The new model 425 may then be used as the feed model 430 to better predict items for the feed of the member based on the feed features 415 and the notification 405 responses. The feed model 430 may be a GBDT, such as click GBDT 330 and viral GBDT 335, which are then used to generate feed action models, such as the specific action logistic regression models 340.

A second layer may be applied to the architecture 400, such as a geo-location or device for the notifications 405 and feed features 415. For example, a member may only click on notifications from a second member when at a first geo-location, such as the member's home. However, the member may click on notifications from a third member at a second geo-location, such as the member's office. This may indicate the second member is a social friend while the third member is a work place contact. This geo-location information from the notification responses may be joined 420 with the feed features 415 to build the new model 415 and further feed models 430. Based on the geo-location response data, the feed model may present updates from the second member in the feed of the member when the member is at the first geo-location and present updates from the third member in the feed of the member when the member is at the second geo-location.

Embeddings sharing is a special case of feature sharing. Embeddings are low dimensional representations of entities such as words, articles, posts, hashtags, members, companies etc. with a specific property that similar entities have similar representation (i.e. distance between two similar entities in the embedding space is small whereas distance between tow dissimilar entities in the embedding space is large). Embeddings may be learned in an unsupervised machine learning way by observation of co-occurrences. For example, if it is observed that the words king and queen often cooccur in articles, it may be inferred that they are similar. Embeddings may also be learned in a supervised machine learning way where entities share similar representation but in context of some action such as click. Embedding sharing may include learning supervised embeddings of both member and content in a shared low dimensional space. This may be done by training a neural network based on the content of the articles and posts with which the member has interacted on feed. These same embeddings learned from feed can be used as features in other verticals such as job search, ads, or notifications.

Figure 5:
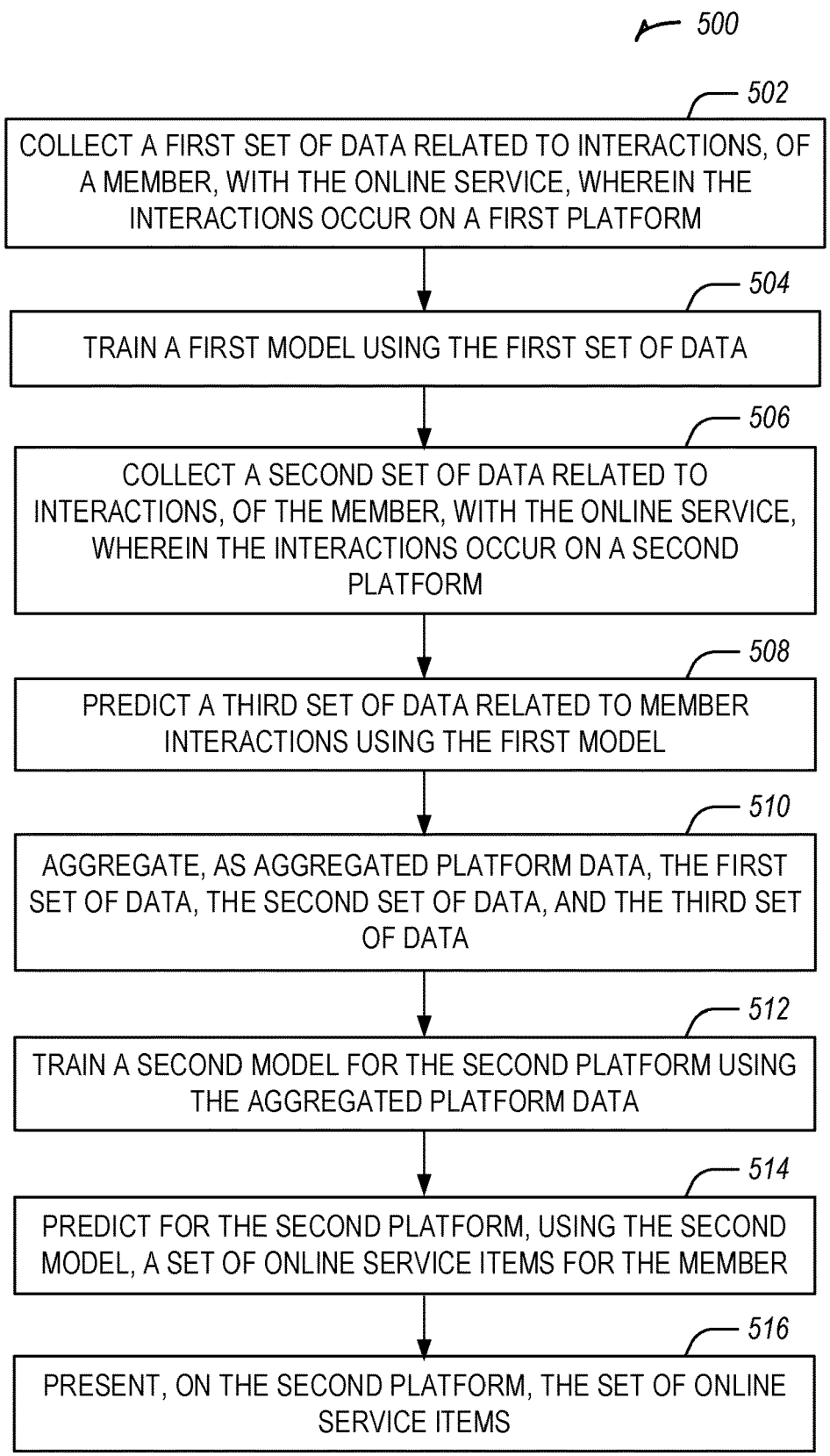
FIG. 5 illustrates a flowchart showing a technique for member relevance prediction with an online service, in accordance with some embodiments.

FIG. 5 illustrates a flowchart showing a technique 500 for member relevance prediction with an online service, in accordance with some embodiments. The technique 500 includes an operation 502 to collect a first set of data related to interactions, of a member, with the online service, wherein the interactions occur on a first platform. The technique 500 includes an operation to train a first model using the first set of data. For example, a model may be trained using data for notification interactions, which may then be used to predict interactions for feed, as seen in operation 508. The technique 500 includes an operation 506 to collect a second set of data related to interactions, of the member, with the online service, wherein the interactions occur on a second platform.

The first platform may be a first device and the second platform may be a second device. For example, the first platform may be a laptop computer and the second platform may be a smartphone. The first platform may be a first operating system and the second platform may be a second operating system. For example, the first platform may be iOS and the second platform may be Android. The first platform may be a first geo-location and the second platform may be a second geo-location, distinct from the first geo-location. For example, the first platform may be a member's home and the second platform may be the member's office. Other geo-locations may be school, a home of a friend, a shopping center, or the airport. The first platform may be a first application and the second platform may be a second application, with applications including messaging, online service feed, notifications, and online service promotions. The interactions of the member may include clicking an internet link, commenting, sharing, or providing a positive acknowledgment.

The technique 500 includes an operation 508 to predict a third set of data related to member interactions using the first model. This model may predict behaviors and interactions of the first platform as it relates to the second platform to generate a relatable data set. The technique 500 includes an operation 510 to aggregate, as aggregated platform data, the first set of data, the second set of data, and the third set of data. The three sets of data may be joined such that the data from the second set and third set may inform the data of the first set. The sets of data may be transformed and relabeled such that primary keys of the three data sets correspond. The technique 500 includes an operation 512 to train a model for the second platform using the aggregated platform data.

The technique 500 includes an operation 514 to predict for the second platform, using the second model, a set of online service items for the member. The set of online service items may include member updates, articles, internet links, videos, images, audio, and job opportunities. The technique 500 includes an operation 516 to present, on the second platform, the set of online service items. For example, a member may access the online service with a smartphone, where the online service presents the set of online service items in the member's feed.

Figure 6:
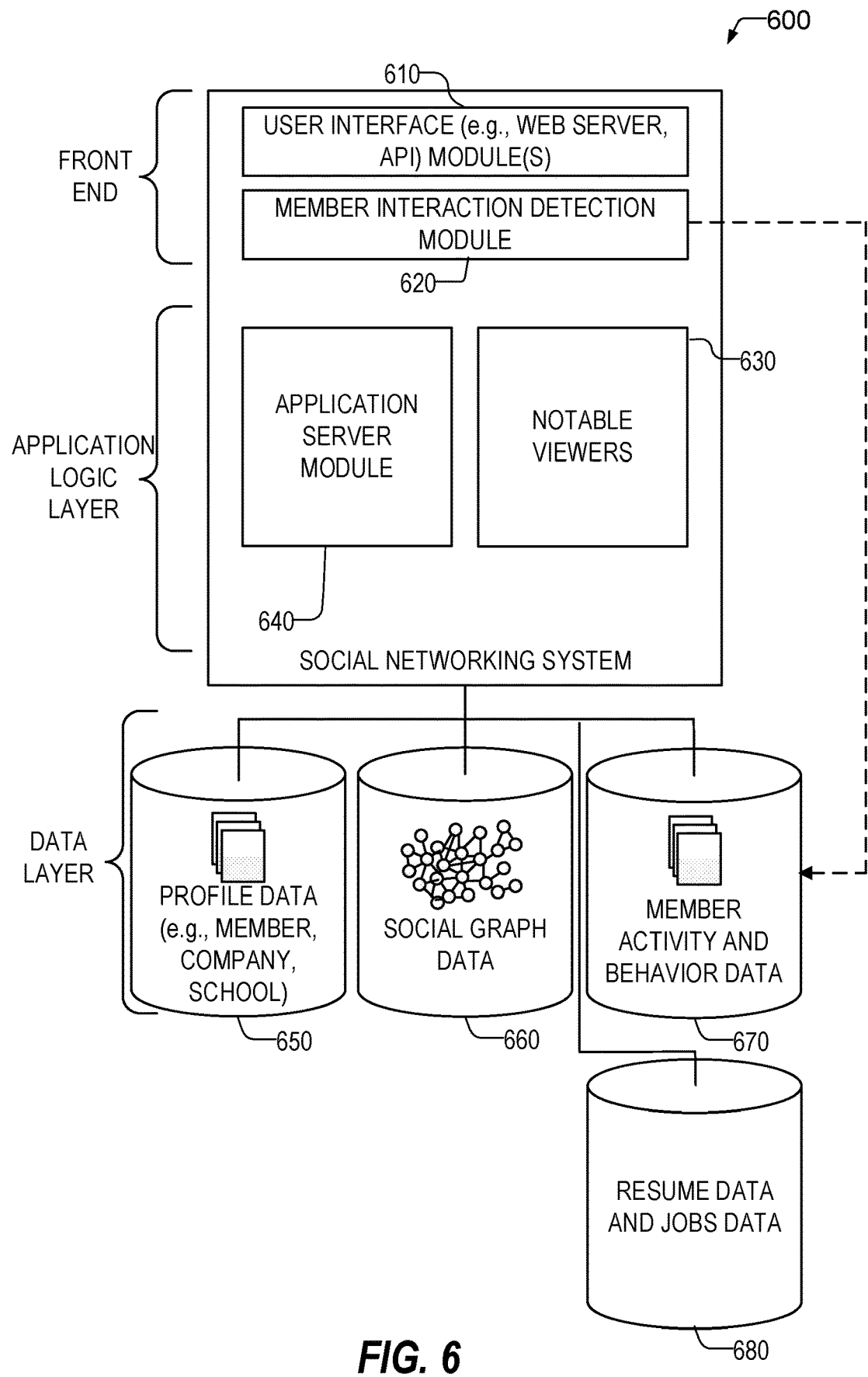
FIG. 6 is a block diagram showing the functional components of a social networking service.
Figure 7:
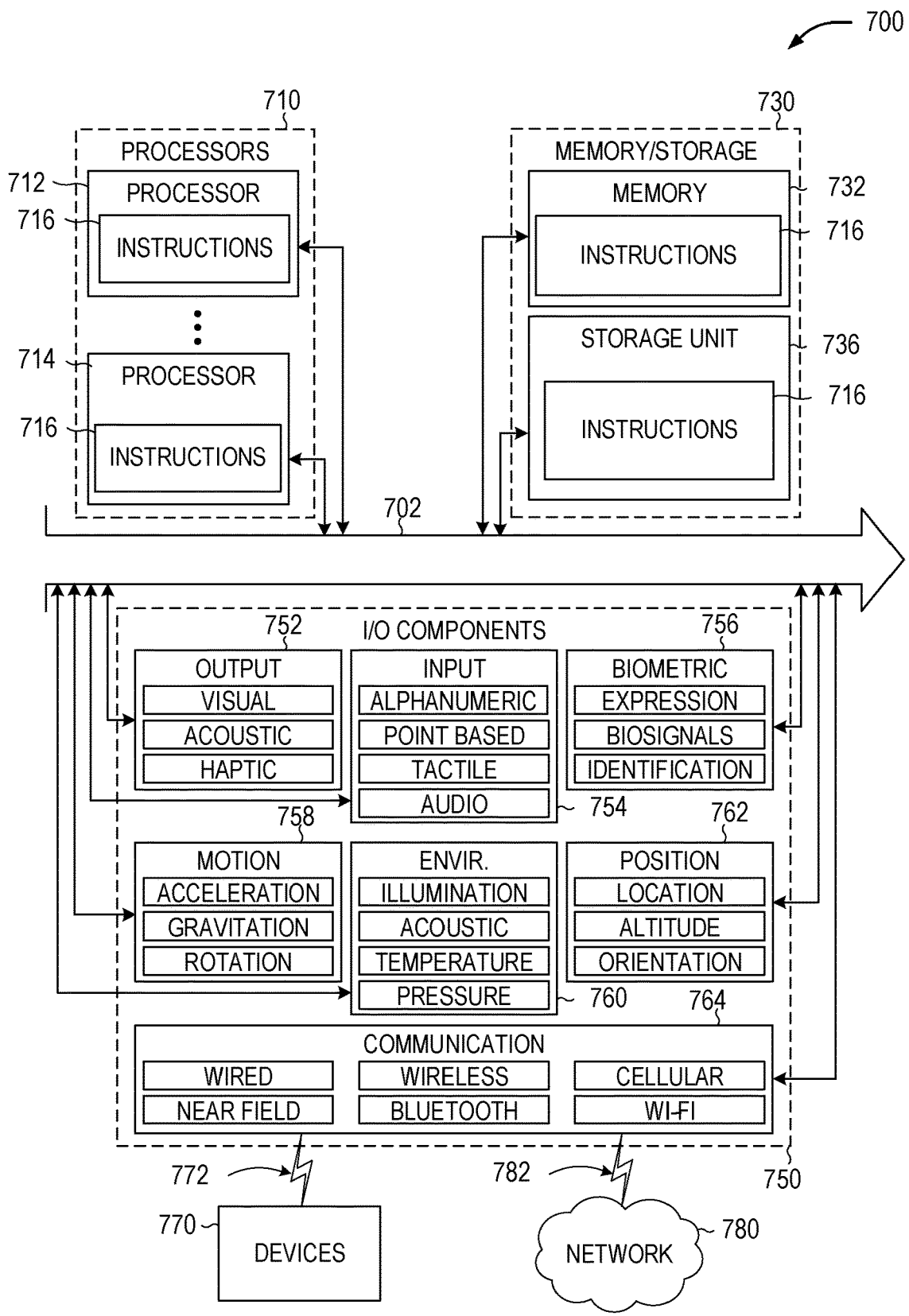
FIG. 7 is a block diagram illustrating an example of a machine upon which one or more embodiments may be implemented.

FIG. 6 is a block diagram showing the functional components of a social networking service 600. As shown in FIG. 6, a front end may comprise a user interface module (e.g., a web server) 610, which receives requests from various client-computing devices, and communicates appropriate responses to the requesting client devices. For example, the user interface module(s) 610 may receive requests in the form of Hypertext Transport Protocol (HTTP) requests, or other network-based, application programming interface (API) requests (e.g., from a dedicated social networking service application running on a client device). In addition, a member interaction and detection module 620 may be provided to detect various interactions that members have with different applications, services and content presented. As shown in FIG. 7, upon detecting a particular interaction, the member interaction and detection module 620 logs the interaction, including the type of interaction and any meta-data relating to the interaction, in the member activity and behavior database 670.

An application logic layer may include one or more various application server modules 640, which, in conjunction with the user interface module(s) 610, generate various graphical user interfaces (e.g., web pages) with data retrieved from various data sources in the data layer. With some embodiments, application server module 640 is used to implement the functionality associated with various applications or services provided by the social networking service as discussed above. Application layer may include notable viewers 630 which may determine notable viewers as described herein.

The data layer may include one or more data storage entities or databases such as profile database 650 for storing profile data, including both member profile attributes as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse or family members, educational background (e.g., schools, majors, matriculation or graduation dates, etc.), employment history, skills, professional organizations, and so on. This information is stored, for example, in the profile database 650. Similarly, when a representative of an organization initially registers the organization with the social networking service, the representative may be prompted to provide certain information about the organization. This information may be stored, for example, in the profile database 650, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Information describing the various associations and relationships, such as connections that the members establish with other members, or with other entities and objects are stored and maintained within a social graph in the social graph database 660. Also, as members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 6 by the member activity and behavior database 670. Information on job postings, job title information, context information, and résumé templates may be stored in résumé data and jobs data 680

With some embodiments, the social networking service 600 provides an application programming interface (API) module with the user interface module 610 via which applications and services can access various data and services provided or maintained by the social networking service. For example, using an API, an application may be able to request or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

FIG. 7 is a block diagram illustrating components of a machine 700 which according to some example embodiments is able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 752 may include a visual output device adapted to provide augmented visual colors, animations, and presentation of information that is determined to best communicate and improve the user's mood to an optimal state as described herein. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components, or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

In various example embodiments, one or more portions of the network 780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Example 1 is a system for member relevance prediction with an online service, comprising: at least one processor; and memory including instructions that, when executed by the at least one processor, cause the at least one processor to: collect a first set of data related to interactions, of a member, with the online service, wherein the interactions occur on a first platform; train a first model using the first set of data; collect a second set of data related to interactions, of the member, with the online service, wherein the interactions occur on a second platform; predict a third set of data related to member interactions using the first model; aggregate, as aggregated platform data, the first set of data, the second set of data, and the third set of data; train a second model for the second platform using the aggregated platform data; predict for the second platform, using the second model, a set of online service items for the member; and present, on the second platform, the set of online service items.

In Example 2, the subject matter of Example 1 includes, wherein the first platform is a first device and the second platform is a second device.

In Example 3, the subject matter of Examples 1-2 includes, wherein the first platform is a first operating system and the second platform is a second operating system.

In Example 4, the subject matter of Examples 1-3 includes, wherein the first platform is a first geo-location and the second platform is a second geo-location, distinct from the first geo-location.

In Example 5, the subject matter of Examples 1-4 includes, wherein the set of online service items includes: member updates, articles, internet links, videos, images, audio, and job opportunities.

In Example 6, the subject matter of Examples 1-5 includes, wherein the interactions include clicking an internet link, commenting, sharing, or providing a positive acknowledgment.

In Example 7, the subject matter of Examples 1-6 includes, wherein the first platform is a first application and the second platform is a second application, and wherein applications include messaging, online service feed, notifications, and online service promotions.

Example 8 is at least one non-transitory computer readable medium including instructions for member relevance prediction with an online service that when executed by at least one processor, cause the at least one processor to: collect a first set of data related to interactions, of a member, with the online service, wherein the interactions occur on a first platform; train a first model using the first set of data; collect a second set of data related to interactions, of the member, with the online service, wherein the interactions occur on a second platform; predict a third set of data related to member interactions using the first model; aggregate, as aggregated platform data, the first set of data, the second set of data, and the third set of data; train a second model for the second platform using the aggregated platform data; predict for the second platform, using the second model, a set of online service items for the member; and present, on the second platform, the set of online service items.

In Example 9, the subject matter of Example 8 includes, wherein the first platform is a first device and the second platform is a second device.

In Example 10, the subject matter of Examples 8-9 includes, wherein the first platform is a first operating system and the second platform is a second operating system.

In Example 11, the subject matter of Examples 8-10 includes, wherein the first platform is a first geo-location and the second platform is a second geo-location, distinct from the first geo-location.

In Example 12, the subject matter of Examples 8-11 includes, wherein the set of online service items includes: member updates, articles, internet links, videos, images, audio, and job opportunities.

In Example 13, the subject matter of Examples 8-12 includes, wherein the interactions include clicking an internet link, commenting, sharing, or providing a positive acknowledgment.

In Example 14, the subject matter of Examples 8-13 includes, wherein the first platform is a first application and the second platform is a second application, and wherein applications include messaging, online service feed, notifications, and online service promotions.

Example 15 is a method for member relevance prediction with an online service, the method comprising: collecting a first set of data related to interactions, of a member, with the online service, wherein the interactions occur on a first platform; training a first model using the first set of data; collecting a second set of data related to interactions, of the member, with the online service, wherein the interactions occur on a second platform; predicting a third set of data related to member interactions using the first model; aggregating, as aggregated platform data, the first set of data, the second set of data, and the third set of data; training a second model for the second platform using the aggregated platform data; predicting for the second platform, using the second model, a set of online service items for the member; and presenting, on the second platform, the set of online service items.

In Example 16, the subject matter of Example 15 includes, wherein the first platform is a first device and the second platform is a second device.

In Example 17, the subject matter of Examples 15-16 includes, wherein the first platform is a first operating system and the second platform is a second operating system.

In Example 18, the subject matter of Examples 15-17 includes, wherein the first platform is a first geo-location and the second platform is a second geo-location, distinct from the first geo-location.

In Example 19, the subject matter of Examples 15-18 includes, wherein the set of online service items includes: member updates, articles, internet links, videos, images, audio, and job opportunities.

In Example 20, the subject matter of Examples 15-19 includes, wherein the interactions include clicking an internet link, commenting, sharing, or providing a positive acknowledgment.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for member relevance prediction with an online service, comprising:
   at least one processor; and
   memory including instructions that, when executed by the at least one processor, cause the at least one processor to:
      collect a first set of data related to interactions, of a member, with the online service, wherein the interactions occur on a first platform;
      train a first model using the first set of data;
      collect a second set of data related to interactions, of the member, with the online service, wherein the interactions occur on a second platform;
      predict a third set of data related to member interactions using the first model;
      aggregate, as aggregated platform data, the first set of data, the second set of data, and the third set of data;
      train a second model for the second platform using the aggregated platform data;
      predict for the second platform, using the second model, a set of online service items for the member; and
      present, on the second platform, the set of online service items.

2. The system of claim 1, wherein the first platform is a first device and the second platform is a second device.

3. The system of claim 1, wherein the first platform is a first operating system and the second platform is a second operating system.

4. The system of claim 1, wherein the first platform is a first geo-location and the second platform is a second geo-location, distinct from the first geo-location.

5. The system of claim 1, wherein the set of online service items includes: member updates, articles, internet links, videos, images, audio, and job opportunities.

6. The system of claim 1, wherein the interactions include clicking an internet link; commenting, sharing, or providing a positive acknowledgment.

7. The system of claim 1, wherein the first platform is a first application and the second platform is a second application, and wherein applications include messaging, online service feed, notifications, and online service promotions.

8. At least one non-transitory computer readable medium including instructions for member relevance prediction with an online service that when executed by at least one processor, cause the at least one processor to:
   collect a first set of data related to interactions, of a member, with the online service, wherein the interactions occur on a first platform;
   train a first model using the first set of data;
   collect a second set of data related to interactions, of the member, with the online service, wherein the interactions occur on a second platform;
   predict a third set of data related to member interactions using the first model;
   aggregate, as aggregated platform data, the first set of data, the second set of data, and the third set of data;
   train a second model for the second platform using the aggregated platform data;
   predict for the second platform, using the second model, a set of online service items for the member; and
   present, on the second platform, the set of online service items.

9. The at least one computer readable medium of claim 8, wherein the first platform is a first device and the second platform is a second device.

10. The at least one computer readable medium of claim 8, wherein the first platform is a first operating system and the second platform is a second operating system.

11. The at least one computer readable medium of claim 8, wherein the first platform is a first geo-location and the second platform is a second geo-location, distinct from the first geo-location.

12. The at least one computer readable medium of claim 8, wherein the set of online service items includes: member updates, articles, internet links, videos, images, audio, and job opportunities.

13. The at least one computer readable medium of claim 8, wherein the interactions include clicking an internet link, commenting, sharing, or providing a positive acknowledgment.

14. The at least one computer readable medium of claim 8, wherein the first platform is a first application and the second platform is a second application, and wherein applications include messaging, online service feed, notifications, and online service promotions.

15. A method for member relevance prediction with an online service, the method comprising:
   collecting a first set of data related to interactions, of a member, with the online service, wherein the interactions occur on a first platform;
   training a first model using the first set of data;
   collecting a second set of data related to interactions, of the member, with the online service, wherein the interactions occur on a second platform;
   predicting a third set of data related to member interactions using the first model;
   aggregating, as aggregated platform data, the first set of data, the second set of data, and the third set of data;
   training a second model for the second platform using the aggregated platform data;
   predicting for the second platform, using the second model, a set of online service items for the member; and
   presenting, on the second platform, the set of online service items.

16. The method of claim 15, wherein the first platform is a first device and the second platform is a second device.

17. The method of claim 15, wherein the first platform is a first operating system and the second platform is a second operating system.

18. The method of claim 15, wherein the first platform is a first geo-location and the second platform is a second geo-location, distinct from the first geo-location.

19. The method of claim 15, wherein the set of online service items includes: member updates, articles, internet links, videos, images, audio, and job opportunities.

20. The method of claim 15, wherein the interactions include clicking an internet link, commenting, sharing, or providing a positive acknowledgment.

* * * * *

UNITED STATES PATENT AND TRADEMARK OFFICE
CERTIFICATE OF CORRECTION

PATENT NO. : 11,423,104 B2
APPLICATION NO. : 16/557263
DATED : August 23, 2022
INVENTOR(S) : Somaiya et al.

Page 1 of 1

It is certified that error appears in the above-identified patent and that said Letters Patent is hereby corrected as shown below:

On the Title Page

On page 2, in Column 2, under "Other Publications", Line 8, delete "Jérõme" and insert --Jérôme-- therefor In the Claims In Column 19, Line 64, in Claim 6, delete "link;" and insert --link,-- therefor Signed and Sealed this
Eighth Day of November, 2022

Katherine Kelly Vidal
*Director of the United States Patent and Trademark Office*